Sept. 24, 1946. J. CRITES 2,408,250
CYCLONE DUST COLLECTOR
Filed Jan. 26, 1944
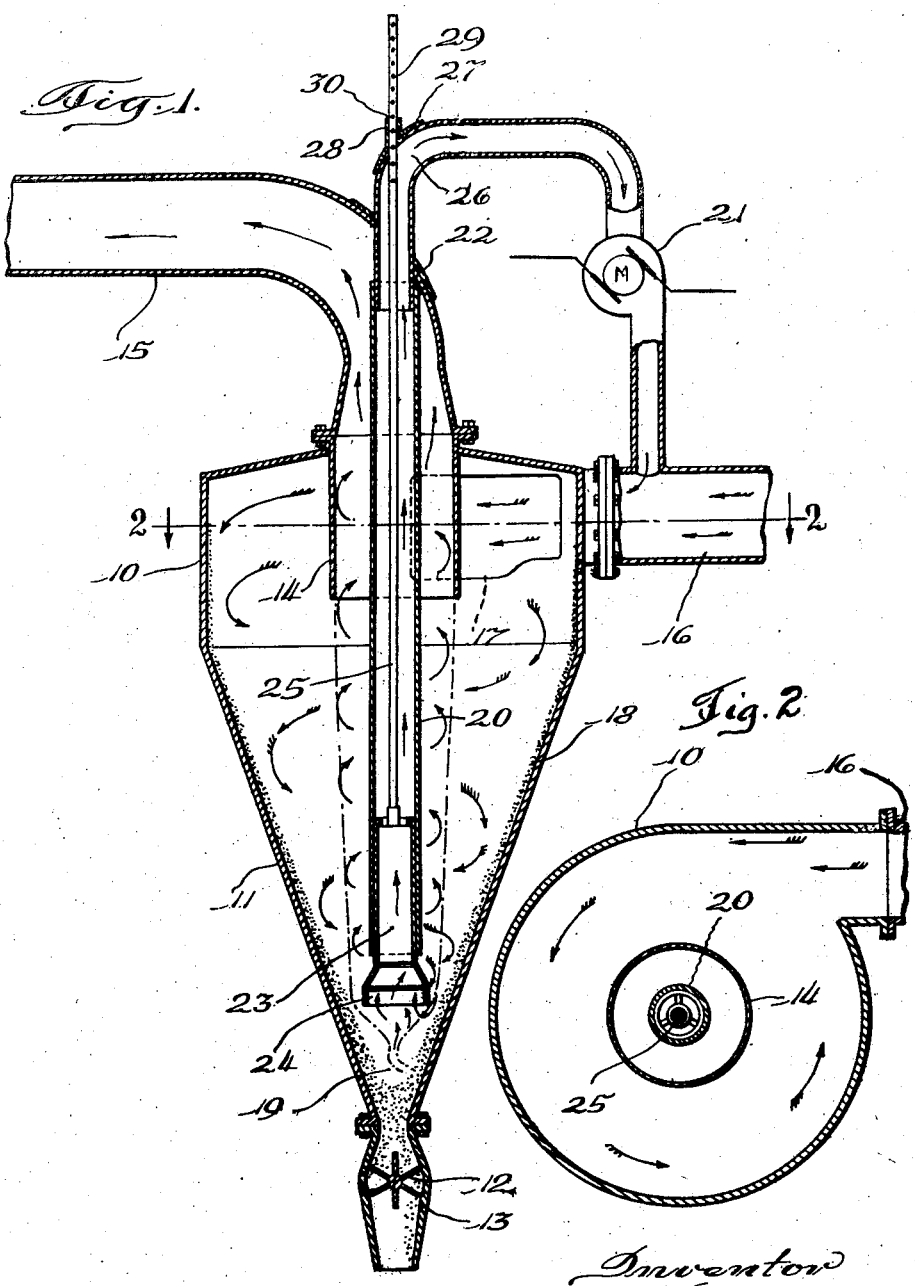
Inventor
Joe Crites
By Barnett & Truman
attorneys Patented Sept. 24, 1946

2,408,250

UNITED STATES PATENT OFFICE 2,408,250

CYCLONE DUST COLLECTOR

Joe Crites, Evanston, Ill., assignor to Combustion Engineering Company, Inc., New York, N. Y., a corporation of Delaware Application January 26, 1944, Serial No. 519,763

2 Claims. (Cl. 183—86)

This invention relates to certain new and useful improvements in cyclone dust collectors and has for its principal object the provision of improved constructions whereby a large percentage of the dust may be removed from dust laden air in a cyclone separator.

A cyclone separator of ordinary construction includes a cylindrical upper portion and a lower conical portion which terminates in a discharge spout. The dust laden air is introduced into the cylindrical upper portion of the separator at a tangent to the inner surface thereof. The whirling of the air forms within the casing two concentric spirals. The outer spiral has a higher pressure and moves downwardly toward the apex of the separator. It functions to precipitate the dust from the air. The inner spiral has a lower pressure and moves upwardly within the casing. Its function is to discharge the air from the separator after the dust has been removed.

The dust particles carried in the air of the outer spiral are thrown outwardly toward the side of the casing, while the air, cleared of the dust, moves tangentially inward toward the vertical axis of the separator to form the inner low pressure spiral which, as previously mentioned, moves upwardly and discharges the air through a central opening in the upper portion of the casing.

The dust particles carried in the air of the outer spiral and thrown outwardly toward the wall of the separator casing create a dust strata which has its maximum density adjacent the wall of the separator. This dense strata may be relatively thin in the upper portion of the casing because of its greater diameter, but the thickness of the strata increases as it moves downwardly with the outer spiral into the restricted lower portion of the cone-shaped collector. Consequently, at the lower portion of the collector, the inner or less dense portion of the dust strata is brought into closer relation to the boundary of the inner low pressure spiral, whereby variations in air pressure or other variable influences may cause portions of this suspended dust to be drawn into the said inner spiral and thereby carried out of the separator with the discharged air. However, the dust lost from a cyclone separator is not necessarily confined to dust held in suspension in the above manner. On the contrary, much of the dust lost from a cyclone separator may have been previously precipitated from the air and then subsequently picked up by a stem-like suction column formed at the lower end of the inner spiral. This stem-like column does not hold a fixed position. On the contrary, it whips or thrashes about within the restricted lower end of the casing and picks up the precipitated dust from the outer spiral near the wall of the collector. This dust is, therefore, held in the low pressure spiral and carried out of the separator casing with the discharged air.

One of the principal objects of the present invention is to provide a new and simplified construction for recapturing the dust picked up by the low pressure inner spiral of air which is within the outer or dust precipitating spiral of a cyclone separator.

A further object is to accomplish the above specified objects by means of a by-pass which intercepts the dust picked up by the said low pressure inner spiral and redelivers it to the inlet end of the separator so that it will be reprecipitated in the separator and thereby make it practicable to remove substantially all dust from the air in a single separator.

A preferred embodiment of the invention is illustrated in the accompanying drawing, wherein:

Fig. 1 is a vertical section taken through the cyclone separator constructed in accordance with this invention; and Fig. 2 is a fragmentary sectional view taken on line 2—2 of Fig. 1.

The separator herein shown is of the cyclone type and includes a cylindrical upper portion 10 and a conical lower portion 11. The lower end is closed by a revoluble discharge valve 12, positioned in a discharge spout structure 13. The valve, it will be noted, is of such construction as to permit the discharge of material from the casing but will prevent the entrance of air into the lower end of the casing.

At the upper end of the separator is an air exit pipe 14 which extends downwardly a substantial distance into the upper end of the casing. The said exit pipe is arranged to be concentric with the axis of the separator and connects with an air discharge pipe 15. The dust laden air is introduced into the cylindrical upper portion of the casing through a conduit 16 which communicates with the separator casing through a wide nozzle 17 of ordinary construction so as to impart to the dust laden air a whirling movement within the separator casing. The flow pattern formed by the air within the casing consists of an outer spiral substantially as indicated by the feathered arrows. This spiral moves downwardly from the inlet toward the discharge end of the casing. The whirling motion of the air serves to throw the dust particles outwardly toward the casing so as to form a dust strata which has its maximum density adjacent the wall of the separator and moves downwardly along the inclined wall of the casing into the restricted lower neck of the casing substantially as indicated by the dotted film of dust material shown at 18 in Fig. 1.

The air, separated from the dust particles, moves inwardly to form an upwardly moving inner spiral, the greatest diameter of which conforms to the diameter of the air exit pipe 14. This inner spiral of air is of lower pressure than the outer, or dust precipitating, spiral and terminates at its apex in a stem-like column 19.

Inasmuch as the diameter of the upper portion of the casing is relatively large, the dust strata formed in this portion of the casing is relatively thin. However, it increases in thickness toward the lower end of the separator. Consequently there is a strong tendency for the dust, particularly the less dense portion of the strata, to be picked up by the inner spiral. In addition to the dust picked up by the inner spiral in the zone where the inner and outer spirals meet, the whipping about of this stem-like column within the restricted area of the separator casing has a pronounced tendency to agitate the precipitated dust in the restricted lower end of the casing so that this dust will be picked up and held in suspension in the inner low pressure spiral of air and carried out of the casing through the exit pipe 14.

In order to overcome this objection the present invention includes the provision of a suction conduit which extends downwardly through the separator in alignment with the axis thereof so that the dust, set in motion at the zone where the inner and outer spirals meet and by the said stem-like column 19 of the low pressure inner spiral of air, will be drawn upwardly through the said conduit 20 by the action of a fan 21, interposed in the said conduit, and delivered into conduit 16, whereupon it is returned to the inlet end of the separator to be again precipitated from the air.

Preferably, the conduit 20 is composed of two sections, the upper section being fixed to the air pipe 13 by any suitable means, for example, a flashing 22. The lower end of the said conduit 20 is designated by the reference numeral 23 and is adjustable relative to the fixed section 20. The lower end of the adjustable section 23 is provided with a suction hood 24 of greater diameter than the conduit and is arranged with its open end downwardly. Preferably the diameter of the hood is equal to approximately one-half of the air exit pipe 14. The said adjustable section is supported by means of a rod 25 which extends out of the conduit 20 at the bend 26 thereof. Preferably a flashing 27 is provided with a collar 28 through which the upper end of the rod 25 extends. The said upper end of the rod is provided with a series of apertures 29, through which a cotter key 30 may be inserted to support the rod and the hood 24 in any predetermined adjusted position. By raising and lowering the adjustable hood section of the conduit 20, it can be positioned in such locations that it will function, under different pressures and volumes of dust being precipitated, to draw the dust agitated by the inner spiral of air downwardly beneath the hood where this dust, together with the dust picked up by the stem-like column 19, is delivered by conduit 20 into the inlet end of the separator casing.

With the present embodiment of the invention there will be a constant discharge of dust laden air through the central conduit 20, but it is returned to the conduit 16 and reintroduced with the other dust laden air into the inlet end of the separator. The air that is discharged through the air conduit 15 is substantially free of suspended dust particles. Tests, in this regard, have shown the improvements of the present invention which, when applied to a cyclone separator, will recapture approximately two-thirds of the dust which would otherwise be lost.

I claim:

1. A cyclone separator comprising, in combination, a conical separator casing having a centrally arranged air discharge in its upper end, means including an inlet conduit for introducing dust laden air into the upper portion of the casing tangentially to the inner surface thereof to form a downwardly moving dust precipitating outer spiral of air and an upwardly moving inner concentric spiral of air being discharged, and means comprising a vertically disposed interceptor conduit arranged concentric to the separator casing and extending upwardly through the casing and said discharge to the exterior of the casing and provided at its lower end with an inverted hood of greater cross-sectional area than said conduit and positioned with its open lower end portion in close relation to the restricted lower end of the separator and said conduit communicating at its other end with the inlet end of the separator, a fan interposed in said interceptor conduit whereby dust suspended in said inner spiral of air at the lower portion of the separator is intercepted by said hood and directed through said interceptor conduit to the inlet conduit of the separator.

2. A cyclone separator comprising, in combination, a conical separator casing, a centrally arranged air discharge pipe extending into the upper end of the separator, means for introducing dust laden air into the upper portion of the casing tangentially to the inner surface thereof to form a dust precipitating outer spiral of air and a low pressure inner spiral for the air being discharged, a centrally disposed by-pass conduit for conducting dust particles suspended in the lower portion of the separator to the dust inlet of the separator, the said by-pass conduit including an upper section rigidly mounted on the upper end of the separator, a rod adjustably suspended from the upper end of the by-pass conduit, a lower section slidably supported within the upper section of said conduit connected to the lower end of said rod and formed with a downwardly opening hood of greater cross-sectional area than the said upper section, whereby the position of the hood may be adjusted relative to the wall of the restricted lower end of the separator to vary the air pressures at the lower ends of the concentric spirals of air within the casing.

JOE CRITES.